3,143,563
BICYCLOOCTANES AND METHOD OF PREPARATION
Homer J. Sims, Philadelphia, Pa., assignor to Rohm & Haas Company, Philadelphia, Pa., a corporation of Delaware
No Drawing. Filed Dec. 21, 1961, Ser. No. 161,291
5 Claims. (Cl. 260—468)

This invention deals with specific bicyclooctanes as new compositions of matter. It further deals with a method for the preparation of these specific bicyclooctanes.

The compounds of the present invention may be represented by the formula

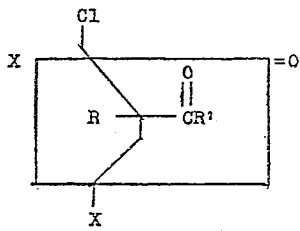

in which R represents a hydrogen atom or a methyl group, R' represents a hydroxy, methoxy, ethoxy, or methyl group, and X represents a chlorine or a hydrogen atom. The preferred compounds of the present invention may be represented by the formula

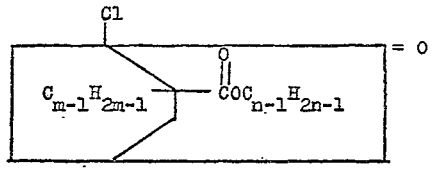

in which $m$ is an integer of 1 to 2 and $n$ is an integer of 1 to 3.

The compounds of the present invention are prepared by hydrogenating a compound having the formula

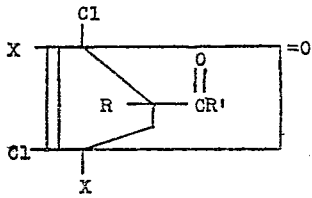

in the presence of a hydrogenation catalyst. If the hydrogen chloride which is formed interferes with the efficient functioning of the catalyst, a scavenger may be employed, such as an inorganic carbonate or alkali, as would be clear to one skilled in the art.

Suitable as catalysts are Raney nickel, Raney cobalt, cobalt-copper, nickel-cobalt, palladium, platinum, rubidium, ruthenium, and the like. The catalyst may be employed in any convenient particle size. If desired, the catalyst may be deposited on a carrier material in order to extend and activate it. Suitable for use as a carrier are activated alumina, activated clays, silica gel, charcoal, asbestos, pumice, and the like. Room temperatures and somewhat above may be employed, preferably from 25° to 200° C. An inert, volatile, organic solvent may be desirable, such as hydrocarbons, alcohols, ethers, and the like. The lower alkanols, such as methanol or ethanol, are particularly suited for this use.

The reaction is conducted at a pressure of 1 to 100 atmospheres, preferably 1 to 10 atmospheres.

The bicyclooctene reactants employed in the present invention are obtained by dedichlorinating the compound having the formula

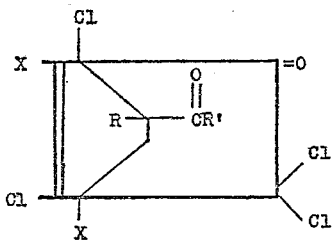

in the presence of a hydrogen generating bimetallic catalyst, such as a zinc-copper couple. The two chlorine atoms that are positioned on the same carbon atom are removed. These just-mentioned compounds are prepared by reacting at about 20 to 120° C. a chlorinated phenyl hypochlorite with the compound having the formula

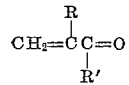

At the conclusion of the present reaction, the product is isolated by removing the catalyst, such as by filtration, followed by either evaporation of the filtrate to dryness or by the addition of water. The products are solids, generally light in color, which may be recrystallized from methanol, ethanol, or aqueous alcohols, or the like.

The compounds of the present invention are useful as fungicides, particularly when applied against *Stemphylium sarcinaeforme* and *Monilinia fructicola* in the usual amounts and evaluated according to standard techniques. Concentrations of 0.05 to 0.5% by weight in a commercial vehicle are effective in this respect.

The compounds of this invention, as well as the method for their preparation, may be more fully understood from the following examples which are offered by way of illustration and not by way of limitation. Parts by weight are used throughout.

*Example 1*

1,5-dichloro-2-keto - 7 - carbomethoxy-[2.2.2]-bicyclooctene-5 (47 parts, 0.2 mole) is dissolved in 150 ml. of dioxane and reduced using 2 parts platinum oxide catalyst in a shaker hydrogenation apparatus at about 12 p.s.i.g. and without external heating. About 0.4 mole of hydrogen is adsorbed. The catalyst is removed by filtration and the filtrate is poured into one liter of water. The product is collected and dried. The product (yield of 33.5 parts) has a M.P. 87° to 91° C. A sample is recrystallized from methanol, M.P. 92° to 95° C. The product contains 55.42% carbon (theoretical 55.43%), 5.93% hydrogen (theoretical 6.05%), and 16.31% chlorine (theoretical 16.37%) and is identified as 1-chloro-2-keto-7-carbomethoxy-[2.2.2]-bicyclooctane having the formula

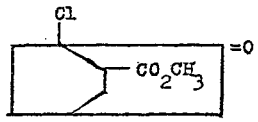

Example 2

0.7 parts of 1,5-dichloro-2-keto-7-methyl-7-carboxy-[2.2.2]-bicyclooctene-5 and 0.1 part of platinum oxide are placed in a pressure bottle with 50 parts of methanol. The bottle is charged with hydrogen to a gauge pressure of 20 p.s.i. and agitated vigorously for about 30 minutes. The catalyst is removed at 25 to 20 mm. vacuum. The product is collected by filtration in a yield of 0.5 part, a melting point above 230° C. The neutralization equivalent of the product is 219. The theoretical value of the neutralization equivalent is 217. The product contains 55.38% carbon (theoretical 55.43%), 6.08% hydrogen (theoretical 6.05%) and 16.20% chlorine (theoretical 16.37%).

The product may be represented by the formula

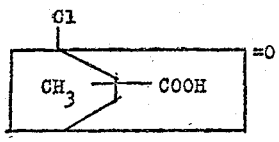

Similarly 1,5,6-trichloro-2-keto - 7 - methyl - 7 - carboxy [2.2.2]-bicyclooctene-5 is reacted with hydrogen in the presence of Raney nickel to form 1,6-dichloro-2-keto-7-methyl-7-carboxy [2.2.2]-bicyclooctane.

Example 3

1.0 part of 1,5-dichloro-2-keto-7-acetyl-[2.2.2]-bicyclooctene-5 and 0.1 part of platinum oxide are placed in a pressure vessel along with 40 parts of absolute ethanol. The vessel is charged with hydrogen to a pressure of 30 p.s.i.g. and agitated for 30 to 45 minutes. The catalyst is removed by filtration and the solvent is evaporated under vacuum. The oily residue crystallizes slowly. Cooling and stirring speeds up the crystallization. The product is dissolved in 25 parts of methanol containing 3 parts of water and decolorized with charcoal. The solvent is again removed under vacuum and the product collected by filtration (0.4 part). It is further purified by recrystallization from petroleum ether. The product has a melting point of 75° to 78° C. The product contains 60.10% carbon (theoretical 59.85%), 6.80% hydrogen (theoretical 6.53%), and 18.30% chlorine (theoretical 17.67%).

The product may be represented by the formula

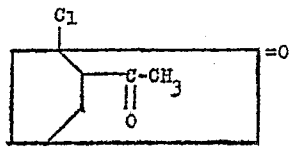

This application is a continuation-in-part of application Serial No. 76,141, filed December 16, 1960, now abandoned.

I claim:
1. A compound having the formula

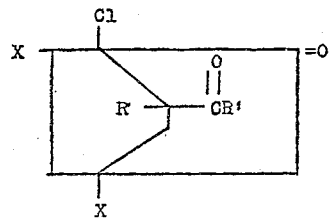

in which R is a member from the class consisting of hydrogen and methyl, R' is a member from the class consisting of hydroxy, methoxy, ethoxy, and methyl, and X is a member from the class consisting of chlorine and hydrogen.

2. The compound, 1-chloro-2-keto-7-carbomethoxy-[2.2.2]-bicyclooctane.

3. The compound, 1-chloro-2-keto-7-methyl-7-carboxy-[2.2.2]-bicyclooctane.

4. The compound, 1-chloro-2-keto-7-acetyl-[2.2.2]-bicyclooctane.

5. A method for the preparation of a compound having the formula

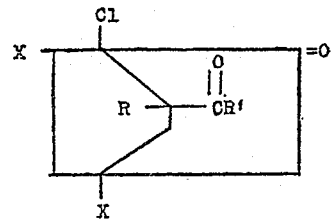

in which R is a member from the class consisting of hydrogen and methyl, R' is a member from the class consisting of hydroxy, methoxy, ethoxy, and methyl, and X is a member from the class consisting of chlorine and hydrogen, which comprises hydrogenating a compound having the formula

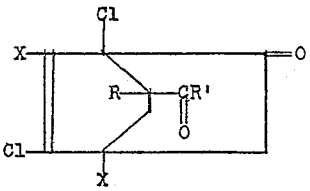

in the presence of a hydrogenation catalyst selected from the group consisting of Raney nickel, Raney cobalt, cobalt-copper, nickel-cobalt, palladium, platinum, rubidium and ruthenium at a temperature of about 25° to 200° C. at pressures of about 1 to 100 atmospheres.

References Cited in the file of this patent

Wagner et al.: Synthetic Org. Chem., pages 7–8 (1953), QD 262. W24.